(12) United States Patent
Crawford (10) Patent No.: US 8,316,038 B2
(45) Date of Patent: Nov. 20, 2012

(54) COLLECTING AND ANALYZING USER ACTIVITIES ON MOBILE COMPUTING DEVICES

(75) Inventor: Jordan Kirk Crawford, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 176 days.

(21) Appl. No.: 12/792,093

(22) Filed: Jun. 2, 2010

(65) Prior Publication Data
US 2011/0302182 A1    Dec. 8, 2011

(51) Int. Cl.
*G06F 17/30*    (2006.01)

(52) U.S. Cl. ........................................................ 707/758

(58) Field of Classification Search ................... 707/723, 707/732, 802, 758; 708/112
See application file for complete search history.

(56) References Cited

U.S. PATENT DOCUMENTS

| | | | |
|---|---|---|---|
| 6,446,076 B1 | 9/2002 | Burkey et al. | |
| 7,084,758 B1 * | 8/2006 | Cole | 340/539.11 |
| 7,725,480 B2 * | 5/2010 | Bassett et al. | 707/758 |
| 2002/0154178 A1 * | 10/2002 | Barnett et al. | 345/853 |
| 2003/0065742 A1 * | 4/2003 | Culp et al. | 709/218 |
| 2006/0294025 A1 | 12/2006 | Mengerink | |
| 2007/0061197 A1 * | 3/2007 | Ramer et al. | 705/14 |
| 2008/0248815 A1 | 10/2008 | Busch | |
| 2009/0036148 A1 * | 2/2009 | Yach | 455/457 |
| 2009/0222482 A1 * | 9/2009 | Klassen et al. | 707/104.1 |
| 2010/0131443 A1 * | 5/2010 | Agarwal et al. | 706/46 |
| 2010/0161506 A1 * | 6/2010 | Bosenick et al. | 705/347 |
| 2010/0169153 A1 * | 7/2010 | Hwacinski et al. | 705/10 |
| 2010/0180001 A1 * | 7/2010 | Hardt | 709/207 |
| 2011/0137954 A1 * | 6/2011 | Diaz | 707/803 |
| 2011/0205850 A1 * | 8/2011 | Annambhotla et al. | 368/14 |
| 2011/0270836 A1 * | 11/2011 | Yang et al. | 707/737 |

FOREIGN PATENT DOCUMENTS

WO    WO-2007/033358 A2    3/2007

OTHER PUBLICATIONS

International Search Report and Written Opinion, International Application No. PCT/US2011/038729, Date of Mailing: Dec. 28, 2011, pp. 1-12.

* cited by examiner

*Primary Examiner* — Cam-Linh Nguyen

(57) ABSTRACT

A mechanism for collecting and analyzing user information available on a mobile computing device is described. Information is retrieved from different components of the mobile computing device and analyzed for relationships therein. Metrics and rules are applied to the information to generate results. The results are displayed or exported to one or more components of the mobile computing device or external devices.

17 Claims, 4 Drawing Sheets

COLLECTING AND ANALYZING USER ACTIVITIES ON MOBILE COMPUTING DEVICES

BACKGROUND

1. Field of Art

The disclosure generally relates to the field of data collection and data mining in computing devices.

2. Description of Art

As mobile computing technology advances, more and more applications become available for mobile computing devices. As a result, users use the mobile computing devices to perform more activities. In addition, mobile computing devices are also equipped with increasing number of sensors such as Global Positioning System (GPS) receivers, accelerometers, and proximity sensors. These sensors, coupled with the increased number of applications, give users access to even more information than has previously been available.

The information from the different sources has inherently relationships (e.g., the GPS receiver tracks the current geographic location while the calendar application provides the user's scheduling information). Currently, there is no solution to automatically collect and analyze the user information available on multiple sources of the mobile computing device to discover the inherent relationships and to provide the user with summaries of the collected user information and the relationships. Accordingly, there is lacking in the art, inter alia, techniques for collecting and analyzing user activities on a mobile computing device.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

General Overview

One embodiment of a disclosed system (and method and non-transitory computer readable storage medium) collects and analyzes user information available on a mobile computing device. Information is retrieved from different components of the mobile computing device and analyzed for relationships therein. Metrics and rules are applied to the information to generate results. The results are displayed or exported to one or more components of the mobile computing device or external devices.

Example Mobile Computing Device

Figures 1A, 1B:
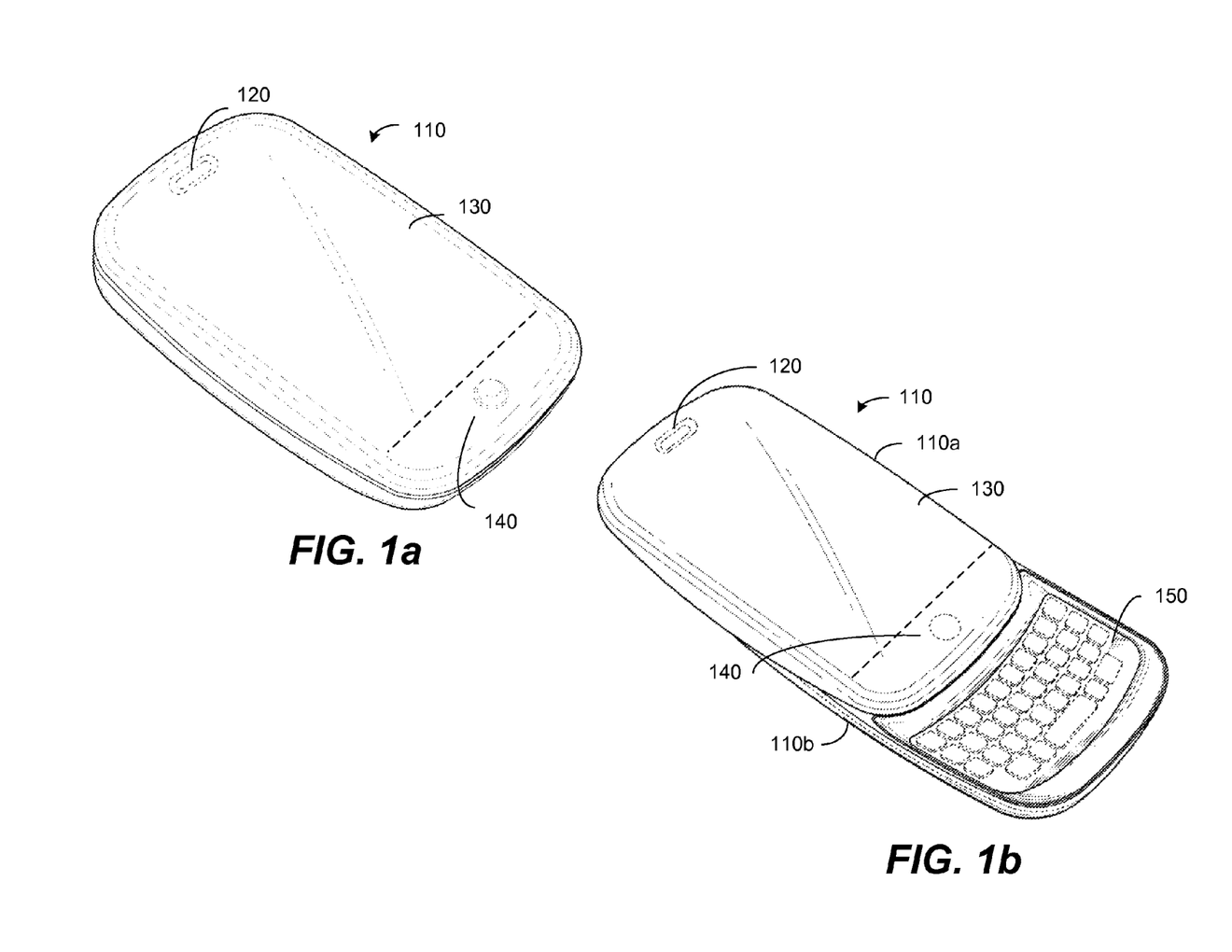
FIG. 1a illustrates one embodiment of a mobile computing device in a first positional state.
FIG. 1b illustrates one embodiment of the mobile computing device in a second positional state.

In one example embodiment, the configuration as disclosed may be configured for use between a mobile computing device, that may be host device, and an accessory device. FIGS. 1a and 1b illustrate one embodiment of a mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. In one embodiment the screen may be 1.5 inches to 5.5 inches (or 4 centimeters to 14 centimeters) diagonally. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infrared)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
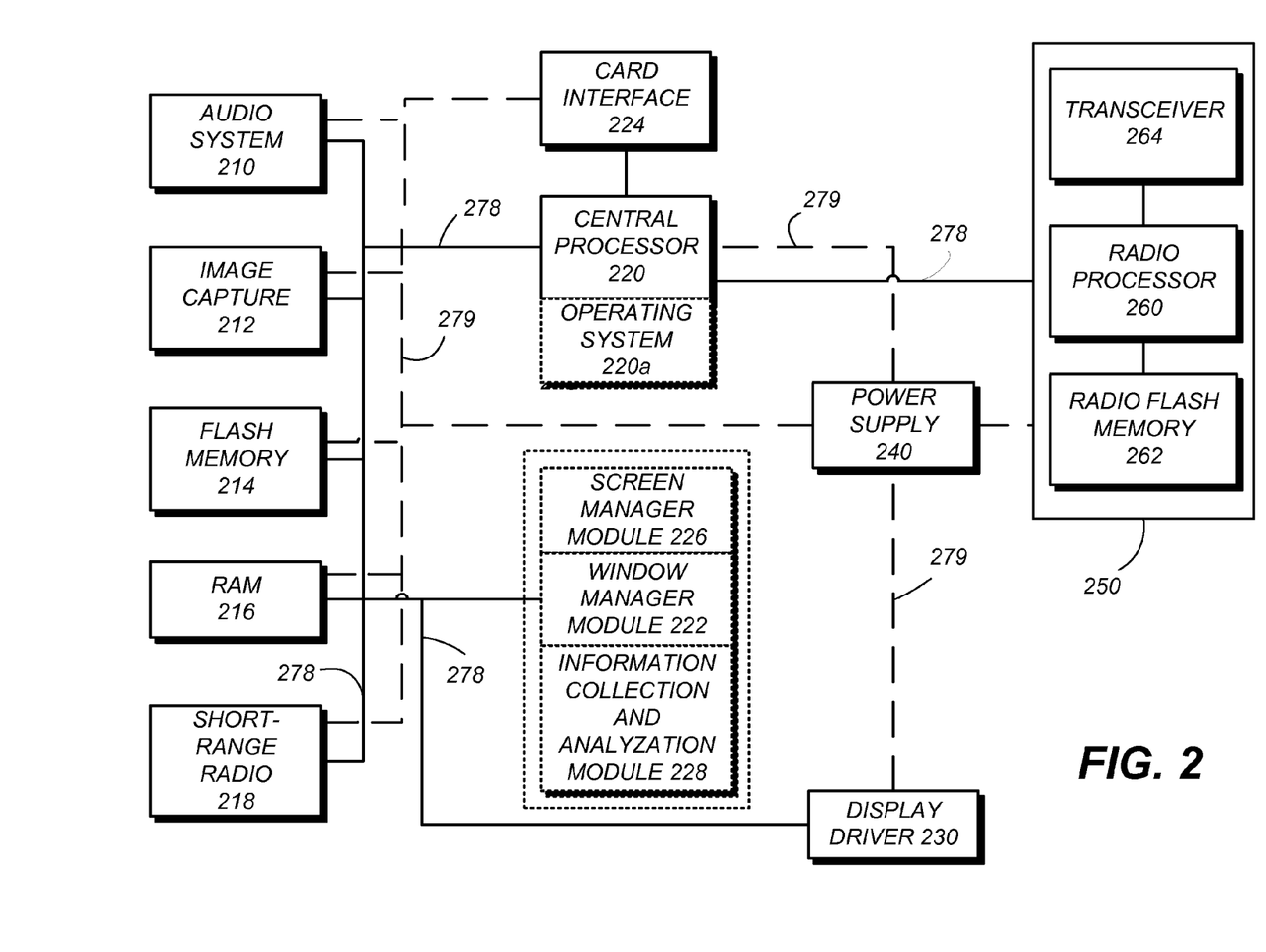
FIG. 2 illustrates one embodiment of an architecture of a mobile computing device.

Referring next to FIG. 2, a block diagram illustrates components of an architecture of a mobile computing device 110 with telephonic functionality, according to one embodiment. By way of example, the architecture illustrated in FIG. 2 will be described with respect to the mobile computing device of FIGS. 1a and 1b. The mobile computing device 110 includes a central processor 220, a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 220 is configured for operation with a computer operating system 220a. The operating system 220a is an interface between hardware and an application, with which a user typically interfaces. The operating system 220a is responsible for the management and coordination of activities and the sharing of resources of the mobile computing device 110. The operating system 220a provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor 220 communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

It is noted that in one embodiment, central processor 220 executes logic (e.g., by way of programming, code, or instructions) corresponding to executing applications interfaced through, for example, the navigation area 140 or switches. It is noted that numerous other components and variations are possible to the hardware architecture of the computing device 200, thus an embodiment such as shown by FIG. 2 is just illustrative of one implementation for an embodiment.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

An information collection and analyzation module 228 comprises software and/or firmware configured to collect information available at other components of the mobile computing device 110 and analyze the collected information to discover useful information such as measurements for various aspects of user activities. The module 228 consolidates the information collected from different sources and stores the consolidated information in a data repository. The module 228 analyzes the collected information to discover relationships among the information retrieved from different sources, and associates the information accordingly. The information collection and analyzation module 228 applies metrics and rules to the associated information and exports the results to other components of the mobile computing device 110.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120. The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) or fourth-generation (4G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Example Architecture of Information Collection and Analyzation Module

Figure 3:
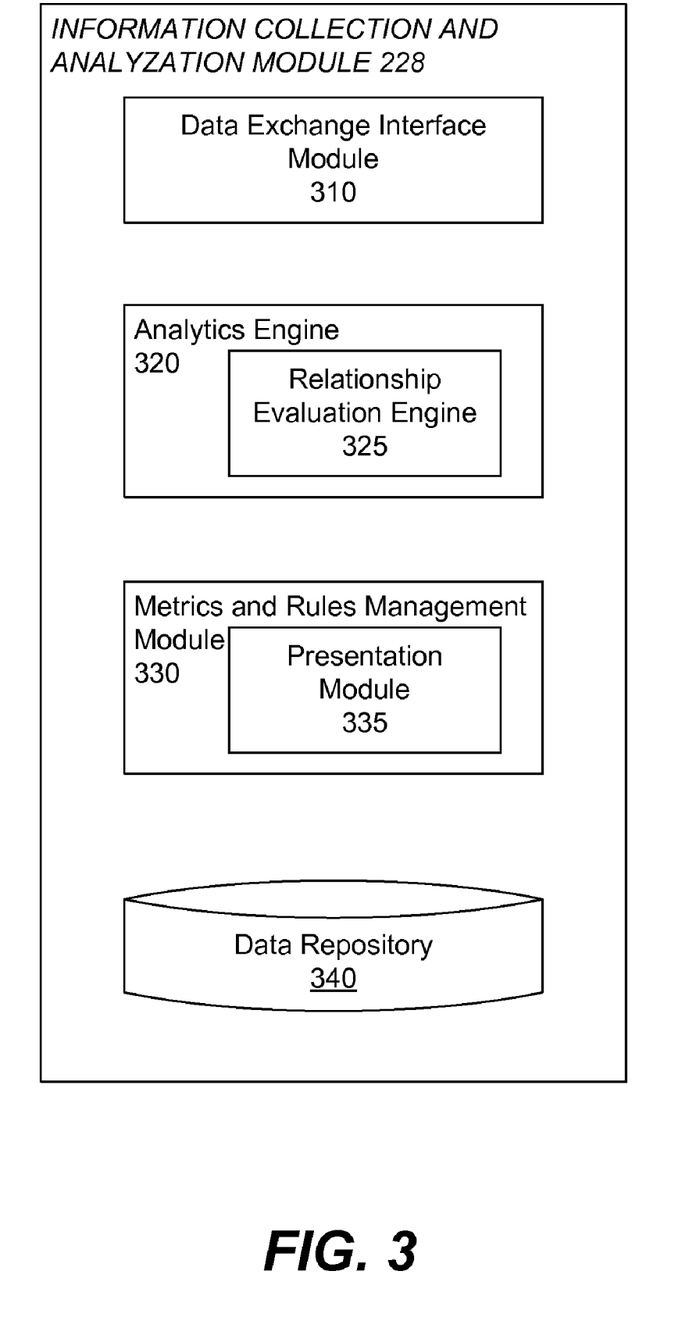
FIG. 3 illustrates one embodiment of an architecture of an information collection and analyzation module.

Referring now to FIG. 3, a block diagram illustrating submodules within the information collection and analyzation module 228 according to one embodiment. Some embodiments of the module 228 have different and/or other submodules than the ones described herein. Similarly, the functions can be distributed among the submodules in accordance with other embodiments in a different manner than is described here. As illustrated, the information collection and analyzation module 228 includes an information exchange interface module 310, an analytics engine 320, a metrics and rules management module 330, and a data repository 340.

The information exchange interface module 310 is configured to collect information from other components of the mobile computing device 110 and export information to such components or external devices. Examples of the components include software applications such as a calendar application, an email application, a contact management application, and on-device sensors (or modules, circuits) such as a clock, a global positioning system (GPS) receiver, and an accelerometer. In one embodiment, the information exchange interface module 310 retrieves data from a component by transmitting a request in a protocol supported by the component. For example, the module 310 may invoke an application programming interface (API) function call to a software application supporting the API to request data from that application. Alternatively or additionally, the information exchange interface module 310 may configure other components (e.g., through API function calls) to periodically provide information to the module 310.

The information exchange interface module 310 consolidates the information collected from different components by converting the collected information into a standard format and storing the converted information in the data repository 340. Information retrieved from different components may be in different formats (e.g., presentation semantics, markup language, character encoding standard, etc.). The information exchange interface module 310 converts the retrieved information from their original formats into a standard format (e.g., Extensible Markup Language (XML)). The following text is an example of converted information about an email message expressed in XML:

```
<?xml version="1.0" encoding='UTF-8'?>
<email>
    <sender>John Doe</sender>
    <to>Jane Doe</to>
    <sent>1/1/2000 9:00 AM EST</sent>
    <viewed>1/1/2000 9:15 AM EST</viewed>
</email>
```

The information exchange interface module 310 exports information to other components of the mobile computing device 110 and/or to external devices (e.g., a desktop computer, a remote server, a standalone GPS device). Before exporting information to a component/device, the module 310 converts the information into a format accepted by the recipient component/device. The information exchange interface module 310 exports information to a component using protocol calls such as application programming interface (API) function calls, and transmits information to an external device through components such as the short range radio module 218 and the radio subsystem 250 using a transmission means (e.g., Bluetooth) supported by the recipient device.

The analytics engine 320 is configured to analyze the retrieved information to discover additional information. For example, responsive to geographic location information retrieved from the on-device GPS receiver and/or motion information from the on-device accelerometer, the analytics engine 320 can estimate the speed and direction of the user, and as a result infer whether the user is walking, driving, or moving using other modes of transportation such as a bicycle. The analytics engine 320 can further determine the user's destination and estimate the arrival time by analyzing information retrieved from other sources, such as the on-device clock for the current day and time, and reference the calendar application for the user's schedule for purposes of determining the user's expected arrival time and the scheduled arrival time in the calendar application. In one embodiment, the analytics engine 320 processes the information stored in the data repository 340 using data search capabilities and statistical algorithms to discover patterns and correlations among the information. As shown, the analytics engine 320 includes a relationship evaluation engine 325.

The relationship evaluation engine 325 is configured to analyze the information to discover relationships among them. For example, information in a calendar entry retrieved from the calendar application indicates that the user is scheduled to attend an on-site meeting in the U.S. Patent and Trademark Office ("USPTO"), and information from the on-device GPS receiver indicates that during that time range the user's latitude and longitude is (38.803054,−77.064012). The analytics engine 320 can derive from such information that the received latitude and longitude information probably is associated with the USPTO's location, and store this association in the data repository 340. As a result, if the GPS subsequently indicates that the user's geographic location is approximate to this latitude and longitude again, the analytics engine 320 can infer that the user probably is revisiting the USPTO and as an example it could automatically add that information to the calendar based on the duration spent at the USPTO.

The metrics and rules management module 330 is configured to apply a set of predefined metrics to the information in the data repository 340. A metric is a function that takes into account one or more pieces of information to generate one or more outputs. The user can create, modify, or remove the metrics through a user interface provided by the metrics and rules management module 330. The following are example metrics designed to measure different aspects of the user's activities.

One example metric measures the average number of emails the user sends out per day. To apply this metric, the metrics and rules management module 330 queries for the outgoing emails in the information retrieved from the email application, determines a total number of such emails, and divides the total number by the number of days during which such emails were sent out. Similarly, the user can create metrics measuring the number of emails received/viewed/responded during a day, the average length of responding emails (e.g., number of words or characters), the total number of new email threads created during the past day/week/month, and the average time spent on emailing per day. The user can also create metrics to track the number of interactions (e.g., email exchanges, phone calls, in-person meetings) with a specific person during a specific period of time (e.g., the number of times of direct interface with the supervisor during the past week), the number of completed tasks, the number of memorandums edited, the number of new contacts added, and the time spent on using a specific application and the frequency of such usage. Metrics may also be used to determine the length of time spent on specific email exchanges. The user can also assign users to groups so that the user can understand her interaction times with those groups.

Another example metric measures the average daily time the user spent in attending meetings. To apply this metric, the metrics and rules management module 330 queries for past meeting appointments in the information retrieved from the calendar application to identify the potential meetings the user may have attended and their associated geographic locations (for in-person meetings) and phone numbers (for phone conferences). The metrics and rules management module 330 can then identify those meetings the user actually attended by comparing the associated information with other user information tracked during the scheduled meeting time. For example, if the geographic location information retrieved from the on-device GPS receiver matches the scheduled meeting location and/or the phone activity information retrieved from the phone application matches the dial-in phone number for the meeting, then the metrics and rules management module 330 determines that the user actually attended the meeting. The metrics and rules management module 330 then calculates the average daily time spent in attending these meetings by summing the meeting time and dividing the total with the number of days. Similarly, the user can create metrics for measuring the average daily time spent on business and/or personal phone calls, the average daily time spent on working/commuting/driving, and the average mileage traveled/drove/walked. The user can also create metrics to track user activities based on the user's location, such as the total number of phone calls made while visiting the USPTO, the average/total time spent at a specific movie theater/restaurant/campus.

In addition to metrics, the metrics and rules management module 330 also applies rules to the information in the data repository 340. A rule is a piece of logic that takes into account one or more pieces of information to perform (or not to perform) one or more actions. The resulting actions of the rules may involve exporting information to other components of the mobile computing device 110 or external devices. Similar to the metrics, the user can create, modify, or remove the rules through a user interface provided by the metrics and rules management module 330.

One example rule exports the geographic location of an upcoming on-site meeting to a GPS application, such that the GPS application can direct the user to the meeting location on time. To apply this rule, the metrics and rules management module 330 periodically queries for the geographic locations of the upcoming scheduled events retrieved from the calendar application, and compares the geographic locations with the current user location retrieved from the on-device GPS receiver to determine whether the user is already on-site. If the two locations are the same (or close by), then the metrics and rules management module 330 determines that no direction is needed, otherwise the module 330 exports the meeting location to the GPS application and instructs the GPS application to direct the user to the scheduled location on time.

Another example rule exports the user's actual geographic locations and activities to the calendar application. To apply this rule, the metrics and rules management module 330 queries for the past user activities (e.g., phone calls made, emails sent out, meetings attended), correlates the activities to the user's geographic locations while the activities took place, and exports such information to the calendar application. As a result, the calendar application creates entries that track the user's activities, geographic locations, and corresponding time ranges. Similar rules can be created to export such information to a time billing software to automatically capture the user's business activities.

As shown, the metrics and rules management module 330 includes a presentation module 335. The presentation module 335 is configured to present the results of the metrics (or the rules) applied by the metrics and rules management module 330. The user can specify, through a user interface provided by the metrics and rules management module 330, when the metrics (or the rules) should be applied, and how the result should be presented. For example, the user may specify that a set of metrics (e.g., those related to summarizing user activities during the previous day) be applied at every midnight, and the results be exported to an excel file. The user can also specify the formats of the display (e.g., a pie chart of personal time vs. work time during the previous day). Alternatively or additionally, the user can specify that a metric (or rule) be applied upon the occurrence of a specific event, such as when a specific scheduled event is about to take place (e.g., generating an activity report when the invoice is due). The user could also set a rule to automatically send out an email at a certain time to summarize the user's activities for the day, week, month, or year.

The data repository 340 stores data used by the information collection and analyzation module 228. Examples of such data include the retrieved information, the discovered relationships, the metrics, and the rules. The data repository 340 may be a relational database or any other type of database.

Example Process of Information Collection and Analyzation Module

Figure 4:
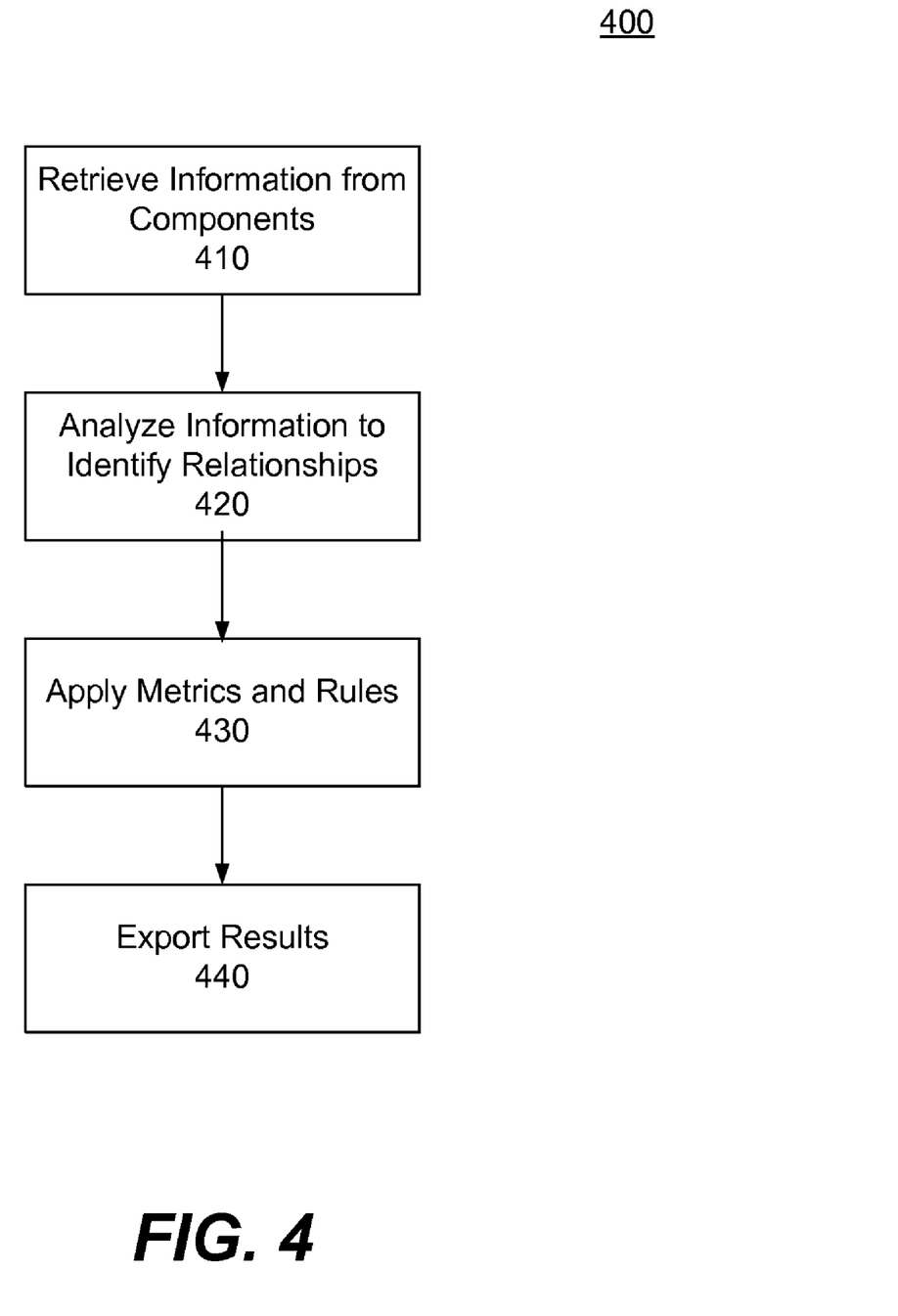
FIG. 4 illustrates one embodiment of a process of an information collection and analyzation module.

Referring now to FIG. 4, a flowchart of a process 400 illustrating a process for the information collection and analyzation module 228 to collect information available at a mobile computing device 110 and analyze the collected information according to one embodiment. Other embodiments can perform the steps of the process 400 in different orders. Moreover, other embodiments can include different and/or additional steps than the ones described herein.

As shown, the information collection and analyzation module 228 retrieves 410 information from a plurality of components of a mobile computing device 110. In one embodiment, the module 228 retrieves 410 the information from a component by transmitting to the component a request in a protocol supported by the component. The module 228 converts the information from different sources into a standard format and stores the information in the data repository 340.

The information collection and analyzation module 228 analyzes 420 the retrieved user information to identify relationships among the user information retrieved from different sources, and associates the related information according to the relationships. For example, the module 228 may associate user information (e.g., user activities, user geographic location) sharing a common attribute (e.g., tracked at the same time) as being related.

The information collection and analyzation module 228 applies 430 metrics and rules to the associated user information, and exports 440 the results to various components of the mobile computing device 110 or external devices. For example, the information collection and analyzation module 228 may periodically generate reports including the metric results and display the reports to the user.

The described configuration provides a mechanism for automatically collecting user information available on a mobile computing device and analyzing such information. Because the mobile computing device has access to a rich collection of user information, this mechanism beneficially enables the user to utilize such user information to automatically and/or periodically generate useful information.

Some portions of above description describe the embodiments in terms of algorithms and symbolic representations of operations on information, for example, as illustrated and described with respect to FIG. 4. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for collecting information available on a mobile computing device and analyzing the collected information to discover useful information through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for collecting and learning user information on a mobile computing device, the method comprising:
    retrieving a calendar entry and location information for the mobile computing device from a calendar application and a global positioning system (GPS) receiver of the mobile computing device, respectively, the location information comprising a geographic location of the mobile computing device at a given time;
    analyzing the retrieved calendar entry and location information to determine if the given time is within a time range of the calendar entry;
    storing an association between an event location identifier included in the calendar entry and the geographic location of the mobile computing device at the given time, if the given time is within the time range of the calendar entry;
    comparing a geographic location associated with another calendar entry for another time range with a geographic location of the mobile computing device during the another time range; and
    determining that the user attended an event associated with the another calendar entry if the geographic location associated with the another calendar entry matches the geographic location of the mobile computing device during the another time range.

2. The method of claim 1, wherein the event location identifier retrieved from the calendar application includes a name of a location associated with the calendar entry, and the geographic location retrieved from the GPS receiver includes a latitude and longitude of the mobile computing device at the given time.

3. The method of claim 1, further comprising:
    determining the geographic location associated with the another calendar entry to be the geographic location associated with the event location identifier, if the another calendar entry includes the event location identifier.

4. A mobile computing device, comprising:
    a global positioning system (GPS) receiver;
    a data repository; and
    a non-transitory computer-readable storage medium storing executable computer program code for collecting and learning user information, the computer program code comprising program code to:
    retrieve a calendar entry from a calendar application of the mobile computing device, the calendar entry comprising an event time range and an event location identifier;
    analyze location information retrieved from the GPS receiver to identify a geographic location of the mobile computing device during the event time range; and
    store, in the data repository, an association between the event location identifier of the retrieved calendar entry and the geographic location of the mobile device during the event time range;
    compare, for each of a first plurality of calendar entries, a scheduled geographic location, associated with the calendar entry, with a geographic location of the mobile computing device during a scheduled time range of the calendar entry, wherein the first plurality of calendar entries includes the retrieved calendar entry; and
    determine, for each of the first plurality of calendar entries, that the user attended an event associated with the calendar entry if the scheduled geographic location matches the geographic location of the mobile computing device during the scheduled time range of the calendar entry.

5. The mobile computing device of claim 4, wherein the event location identifier retrieved from the calendar application includes a name of a location associated with the calendar entry, and the geographic location retrieved from the GPS receiver includes a latitude and longitude of the mobile computing device during the event time range.

6. The mobile computing device of claim 4, wherein the program code further comprises program code to:
    determine, for each of the first plurality of calendar entries, that the scheduled geographic location is the geographic location associated with the event location identifier if the calendar entry is associated with the event location identifier.

7. The mobile computing device of claim 6, wherein the program code further comprises program code to:
    compare, for each of a second plurality of calendar entries, a phone number, associated with the calendar entry, with phone activity of the mobile computing device during a scheduled time range of the calendar entry; and
    determine, for each of the second plurality of calendar entries, that the user attended an event associated with the calendar entry if the phone activity of the mobile computing device during the scheduled time range of the calendar entry matches the phone number associated with the calendar entry.

8. The mobile computing device of claim 7, wherein the program code further comprises program code to:
    calculate an average daily time spent attending meetings, based on each of the events determined to have been attended by the user in accordance with the first and second pluralities of calendar entries, wherein each of the first and second pluralities of calendar entries is associated with a meeting.

9. The mobile computing device of claim 4, wherein the program code further comprises program code to:
    track a total amount of time spent at a location.

10. The mobile computing device of claim 9, wherein the location is associated with the event location identifier.

11. A non-transitory computer-readable storage medium encoded with executable computer program code for collecting and learning user information on a mobile computing device, the computer program code comprising program code to:

retrieve a calendar entry and location information for the mobile computing device from a calendar application and a global positioning system (GPS) receiver of the mobile computing device, respectively;

analyze the retrieved calendar entry and location information to determine a geographic location of the mobile computing device during a time range of the calendar entry; and store an association between an event location identifier included in the retrieved calendar entry and the geographic location of the mobile computing device during the time range of the calendar event;

compare, for each of a first plurality of calendar entries, a scheduled geographic location, associated with the calendar entry, with a geographic location of the mobile computing device during a scheduled time range of the calendar entry, wherein the first plurality of calendar entries includes the retrieved calendar entry; and determine, for each of the first plurality of calendar entries, that the user attended an event associated with the calendar entry if the scheduled geographic location matches the geographic location of the mobile computing device during the scheduled time range of the calendar entry.

12. The non-transitory computer-readable storage medium of claim 11, wherein the event location identifier retrieved from the calendar application includes a name of a location associated with the calendar entry, and the geographic location retrieved from the GPS receiver includes a latitude and longitude of the mobile computing device during the time range of the calendar entry.

13. The non-transitory computer-readable storage medium of claim 11, wherein the program code further comprises program code to:

determine, for each of the first plurality of calendar entries, that the scheduled geographic location is the geographic location associated with the event location identifier if the calendar entry is associated with the event location identifier.

14. The non-transitory computer-readable storage medium of claim 13, wherein the program code further comprises program code to:

compare, for each of a second plurality of calendar entries, a phone number associated with the calendar entry with phone activity of the mobile computing device during a scheduled time range of the calendar entry; and determine, for each of the second plurality of calendar entries, that the user attended an event associated with the calendar entry if the phone activity of the mobile computing device during the scheduled time range of the calendar entry matches the phone number associated with the calendar entry.

15. The non-transitory computer-readable storage medium of claim 14, wherein the program code further comprises program code to:

calculate an average daily time spent attending meetings, based on each of the events determined to have been attended by the user in accordance with the first and second pluralities of calendar entries, wherein each of the first and second pluralities of calendar entries is associated with a meeting.

16. The non-transitory computer-readable storage medium of claim 11, wherein the program code further comprises program code to:

track an average amount of time spent at a location.

17. The non-transitory computer-readable storage medium of claim 16, wherein the location is associated with the event location identifier.

* * * * *